UNITED STATES PATENT OFFICE.

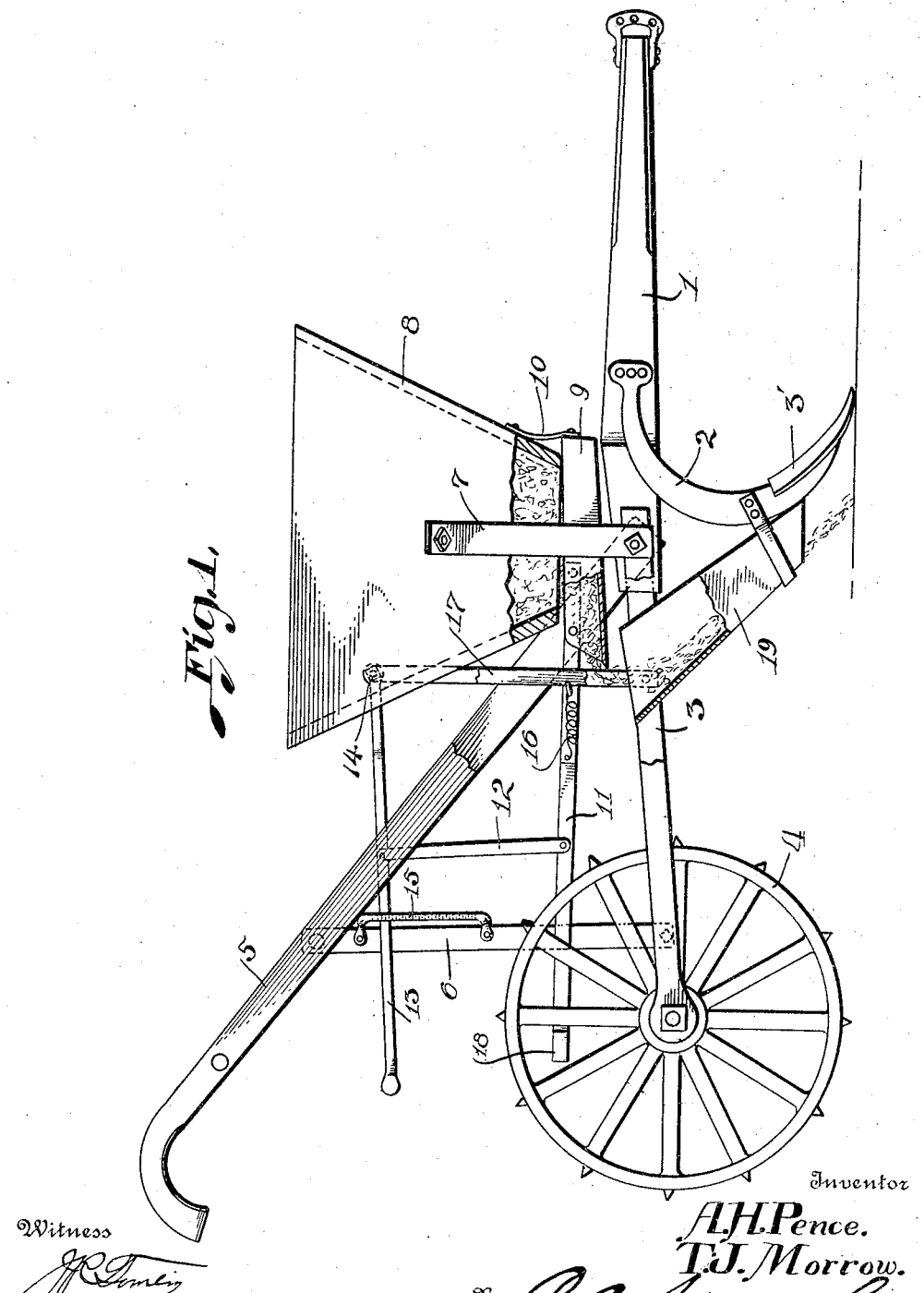

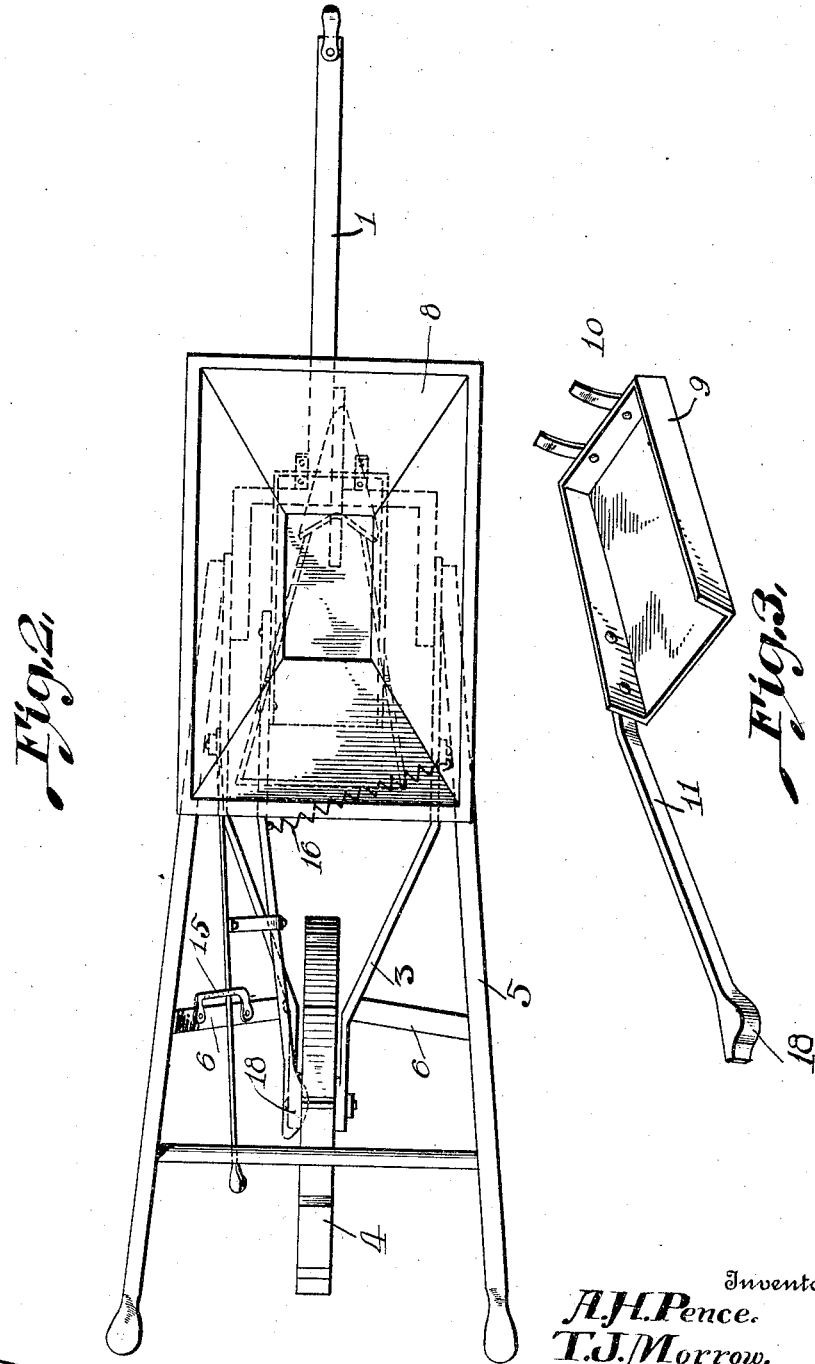

ALONZO H. PENCE AND THOMAS J. MORROW, OF SOMERVILLE, ALABAMA.

FERTILIZER-DISTRIBUTER.

1,327,353.    Specification of Letters Patent.    Patented Jan. 6, 1920.

Application filed September 6, 1919. Serial No. 322,100.

*To all whom it may concern:*

Be it known that we, ALONZO H. PENCE and THOMAS J. MORROW, citizens of the United States, residing at Somerville, in the county of Morgan, State of Alabama, have invented a new and useful Fertilizer-Distributer, of which the following is a specification.

This invention relates to apparatus for distributing fertilizer, one of its objects being to provide a simple, compact and efficient mechanism which can be made at low cost, and which will operate automatically during the forward movement of the machine, means being provided whereby the amount of fertilizer distributed can be regulated at will.

Another object is to provide operating mechanism having the minimum number of parts and which will not readily get out of order.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings

Figure 1 is a view partly in side elevation and partly in section of the device.

Fig. 2 is a plan view.

Fig. 3 is a detail view of the distributing pan.

Referring to the figures by characters of reference 1 designates a draft beam to which is connected the standard 2 of a furrow opener 3'. Side strips 3 extend from this beam and have a wheel 4 journaled between them. Handles 5 extend from the sides of the beam and are connected to the side strips 3 by braces 6 and mounted above the beam 1 on standards 7 is a hopper 8 having an open bottom.

A pan 9, which is open at its rear end, is supported under the hopper by spring strips 10 connecting the front of the pan with the front of the hopper and an arm 11 is fixedly secured to one side of the pan and extends rearwardly therefrom. A link 12 connects this arm with a lever 13 which is pivotally connected to the hopper as shown at 14, and a notched or toothed strip 15 is attached to the brace 6 at one side of the machine and is adapted to be engaged by the lever to hold said lever in any position to which it may be adjusted.

A spring 16 connects the arm 11 to one of a pair of side braces 17 connecting the hopper to the strips 3 and serves to pull the arm laterally so that a node 18 on the end thereof will project into the path of the spokes of the wheel 4.

A boot 19 is secured to the side strips 3 and to the standard 2 and is so located as to receive material from the open end of the pan 9 and direct it into the furrow back of the opener 3'.

When the machine is moved forward the spokes formed with the wheel will successively strike the node 18 and thrust it laterally after which the spring 16 will bring it back again into the path of the spokes. This will set up a lateral oscillation or vibration of the pan which will be sufficient to cause the material to gravitate from the pan and into the boot 19. By raising and lowering the lever 13 the pan can be raised and lowered and the discharge of material thus controlled.

What is claimed is:—

1. In a fertilizer distributer a wheel, a structure mounted thereon, a hopper carried by said structure, a boot, a pan open at one end and receiving material from the hopper for directing it into the boot, an arm extending from the pan, yielding means for pressing one end of the arm laterally into the path of the spokes of the wheel, an adjusting lever, and a connection between said lever and the arm.

2. In a fertilizer distributer a wheel, a structure mounted thereon, a hopper carried by said structure, a pan open at one end and receiving material from the hopper, a boot for receiving material from the open end of the pan, an arm extending from the pan, a projection thereon, a spring connected to the arm for shifting the projection laterally into the path of the spokes of the wheel, an adjusting lever, and a connection between said lever and the arm.

3. In a fertilizer distributer a wheel, a structure mounted thereon, a hopper on the structure, a pan open at one end and movably mounted under the hopper, a boot for receiving material from the open end of the pan, an arm extending from the pan, a projection thereon, a spring connected to the arm for drawing the projection laterally into the path of the spokes of the wheel, an adjusting lever, a connection between the lever and the arm, means for holding the lever against movement.

In testimony that we claim the foregoing as our own, we have hereto affixed our signatures in the presence of two witnesses.

ALONZO H. PENCE.
THOMAS J. MORROW

Witnesses:
 THOMAS E. KYLE,
 JOHN E. BRISCOE.